United States Patent [19]
McKinstry et al.

[11] 4,192,790
[45] Mar. 11, 1980

[54] ELASTOMERIC COMPOSITION HAVING REDUCED MOONEY VISCOSITY

[75] Inventors: Paul H. McKinstry; Robert R. Barnhart, both of Naugatuck, Conn.

[73] Assignee: Uniroyal, Inc., New York, N.Y.

[21] Appl. No.: 655,609

[22] Filed: Feb. 25, 1976

[51] Int. Cl.$^2$ ............................................. C08K 5/09
[52] U.S. Cl. ..................... 260/31.2 MR; 260/31.2 N; 260/42.32; 260/42.33; 260/42.36; 260/42.37; 260/42.47; 260/756; 525/5
[58] Field of Search ..................... 260/31.2 MR, 42.32, 260/42.33, 42.36, 42.37, 42.47, 31.2 N, 756; 526/5

[56] References Cited

U.S. PATENT DOCUMENTS

3,823,122  7/1974  Schuh et al. ............................ 525/4

FOREIGN PATENT DOCUMENTS

1364138  8/1974  United Kingdom .

OTHER PUBLICATIONS

South African Abstract 73/2302, Princeton Chemical Research, Mar. 27, 1974.
Chemical Abstracts, vol. 66, 56358c (1967).
Chemical Abstracts, vol. 68, 13852h (1968).

*Primary Examiner*—James H. Derrington
*Attorney, Agent, or Firm*—James J. Long

[57] ABSTRACT

The viscosity of synthetic and/or natural elastomers is markedly reduced by incorporation of a particulate, finely-divided basic zinc methacrylate-type adjuvant, without adversely affecting the physical properties of the final vulcanizates. This viscosity reduction allows higher levels of fillers and other rubber compounding materials to be used for improved physical properties, while maintaining the level of compound viscosity necessary for processing.

4 Claims, No Drawings

ELASTOMERIC COMPOSITION HAVING REDUCED MOONEY VISCOSITY

This invention relates to a filled elastomeric composition having reduced Mooney viscosity in the compounded state, and to a method of making such composition.

Copending application of Frank S. Martin, et al, Ser. No. 441,716, filed Feb. 11, 1974 (which is a continuation-in-part of Ser. No. 284,303, filed Aug. 28, 1972), discloses a basic zinc methacrylate-type adjuvant useful in the present invention, and its use in elastomeric compositions, but reduction of Mooney viscosity by use of such adjuvant as in the present invention is not disclosed.

British Pat. No. 1,364,138, Acushnet Company, Aug. 21, 1974 (corresponding to U.S. application Ser. No. 218,561, filed Jan. 17, 1972, Schweiker et al) and South African application No. 73/2302 Princeton Chemical Research, published Mar. 27, 1974 (corresponding to U.S. application Ser. No. 250,147, filed May 4, 1972, Pollitt et al), disclose zinc oxide-methacrylic acid in elastomeric compositions, but reduction of compound Mooney viscosity as in the present invention is not disclosed.

The Mooney viscosity of a rubber compound is one parameter used to measure its processing characteristics. The rubber compounder will often adjust a rubber compound's viscosity to facilitate its mixing, mill handling, extrusion or calendering. Until now, the various compounding methods available for viscosity reduction also caused a loss in the cured properties of the rubber item. Aromatic and paraffinic oils, plasticizers (i.e., dioctyl phthalate, dioctyl adipate, etc.) and certain hydrocarbon resinous materials must be used in comparatively high levels to effect significant viscosity reduction. These additives can also have the added disadvantages of being extractable, hard to handle or mix, and migratory.

Several chemical "processing aids" have been introduced in recent years. In most cases these "processing aids" are proprietary blends of fatty acids and/or their metallic salts. Most of the processing aids are liquids or pastes which are difficult to handle on normal rubber mixing equipment. These chemicals often also have the same disadvantages as certain oils and plasticizers, i.e., extractable, migratory, blooming, staining, and also lower the moduli, hardness, and tensile strength of the rubber compound to which they are added.

The present invention is based on the discovery that the addition of a metal salt of a monoethylenically unsaturated carboxylic acid, especially particulate, finely divided basic zinc methacrylate adjuvant, to rubber compounds, containing particulate inorganic fillers, will significantly reduce the Mooney viscosity of said compounds.

A further feature of this invention is that the herein employed basic zinc methacrylate-type adjuvant also improves the processing characteristics of the rubber compound to which it is added.

The "basic zinc methacrylate-type" adjuvant employed in this invention is disclosed in the Martin et al application Ser. No. 441,716 referred to above. It may be described as a finely divided, particulate reaction product of zinc oxide and methacrylic acid containing approximately a one-to-one molar ratio of zinc and the methacrylic acid radical.

Other methacrylate salts of interest include neutral (normal) zinc salt, sodium salt, basic salt of calcium, magnesium, lead, etc. Also of interest are zinc or other metal salts of acrylic acid, cinnamic acid, etc.

The rheological properties of rubber compounds containing (A) one or more rubbers, (B) an inorganic filler, and, if desired (C) other materials commonly used in rubber compounds, can be significantly improved by the addition of 0.1 to 7 parts by weight (based on 100 parts by weight of polymer phase), preferably 1 to 6 parts, most preferably 5 parts, of the described basic zinc methacrylate-type adjuvant.

(A) The rubber employed may be any conventional elastomer or elastomer blend, such as a polymer of a conjugated diene (e.g., butadiene, isoprene, etc.) whether a homopolymer as in polybutadiene, polyisoprene (natural or synthetic), etc., or whether a copolymer of such diene with a copolymerizable monoethylenically unsaturated monomer such as a vinyl aryl compound (e.g., styrene, alpha-methyl styrene), an acrylic nitrile (e.g., acrylonitrile), vinyl pyridine, etc., as represented by butadiene-styrene copolymer, butadiene-acrylonitrile copolymer, isobutylene-isoprene copolymer, etc. For further examples of such conventional conjugated diolefin polymer rubbers reference may be had to U.S. Pat. No. 3,837,993, Sept. 24, 1974, Shimmel, col. 3, lines 10–36. Also suitable are the alpha-monoolefin copolymer elastomers as represented by ethylene-propylene copolymers with or without a copolymerizable non-conjugated diene, whether an open chain diene as in 1,4-hexadiene or cyclic as in such bridged ring compounds as dicyclopentadiene, methylene norbornene, or the alkylidene norbornenes (e.g. 5-ethylidene-2-norbornene). For further description and examples of coventional monoolefin copolymer rubbers reference may be had to U.S. Pat. No. 3,835,201, Sept. 10, 1974, Fischer, col. 3, lines 19–57. Blends of elastomers with each other or with other polymers are also suitable, especially elastomeric blends of butadiene-acrylonitrile rubber with polyvinyl chloride resin, or elastomeric blends of alpha-monoolefin copolymer type rubbers with polybutadiene resin.

(B) The inorganic particulate fillers employed are finely divided particulate substances and include silica fillers such as precipitated hydrated silica, calcium carbonate (e.g. coated ground oyster shells), silicates such as clay, hydrated aluminum silicate (whether untreated or coated with an organo functional silane coupling agent), or blends thereof. The amount of inorganic particulate filler (B) employed is from 40 to 140 parts by weight, preferably from 50 to 100 parts, per 100 parts by weight of the elastomeric component (A). In many cases the composition of the invention frequently further contains carbon black (e.g., 20 to 150 parts per 100 parts of elastomer) in addition to the essential particulate inorganic filler.

(C) Further optional compounding ingredients, appropriate to the particular composition and end use, that may be present include other fillers such as the organic filler carbon black, zinc oxide, calcium stearate, curatives (e.g., peroxide curing systems, sulfur curing systems) accelerators, process oil, antioxidants, waxes, pigments, and other conventional ingredients in the usual amounts. For vulcanization or cure of the elastomer the composition includes sulfur (or sulfur-yielding curative) or peroxide curative, in conventional amount sufficient to cure the particular elastomer.

Carbon black is referred to herein as an "organic filler" in recognition of the well known fact that it has a significant content of organic material (see "Analysis of Carbon Black" Schubert et al., Encyclopedia of Industrial Chemical Analysis, Vol. 8, p. 191-192, John Wiley & Sons, 1969). The expression "inorganic filler" as used herein accordingly means filler other than carbon black. It will be understood that the use of inorganic filler other than carbon black is an essential feature of the invention, but, optionally, carbon black may also be present in amount up to the quantity indicated above (i.e., there may be zero parts of carbon black, or as much as 150 parts), in addition to the essential non-black filler.

A particularly preferred form of the invention is represented by compositions compounded for sulfur cure, whether with sulfur itself or a sulfur donating curative, ordinarily along with one or more of the usual conventional organic accelerators of sulfur vulcanization as well as conventional activating substances (e.g. zinc oxide-stearic acid) for sulfur vulcanization, all in conventional amounts effective to produce sulfur vulcanization of the elastomer. Outstanding advantages that are obtained by using the present basic zinc methacrylate type adjuvant in sulfur curing elastomeric compositions include not only marked reduction in compounded viscosity with non-black fillers, but also remarkably improved Mooney scorch safety while at the same time providing excellent modulus, tensile and hardness values in the final sulfur-cured product. The lower viscosity and longer scorch time of the present sulfur curing compositions containing the basic zinc methacrylate additive render such compositions particularly useful for making extruded articles.

The rubber compounds may be prepared by any conventional means such as an internal mixer (e.g., Banbury; trademark) or two roll mills. Usually in the absence of curatives, the rubber(s), fillers, oils and other ingredients are combined using a Banbury at mixing temperatures from 250° F. to 320° F. These rubber masterbatches are sheeted off two-roll mills and cooled.

The curatives may then be added to the blended masterbatches in a second Banbury mix or on a two-roll mill at normal rubber processing temperatures not to exceed 250° F. to preclude premature cure to the finished compound.

Basic zinc methacrylate can be added either in the materbatch state (i.e. if the curative has not yet been added) or more preferably in the final mixing state (when the curative is added).

It will be understood that the basic zinc methacrylate is added after mixing the elastomer and inorganic filler. The basic zinc methacrylate is blended in at a temperature insufficient to bring about vulcanization or cure.

Among the advantages of the invention there may be mentioned the following:
1. Reduced compound Mooney viscosity.
2. Improved compound extrusion characteristics.
3. Activates and increases the ultimate state of cure of synthetic rubbers cured with peroxide.
4. Activates the sulfur cure of clay filled natural rubber compounds.
5. Provides improved scorch safety in sulfur cures of natural rubber or nitrile rubber-PVC blend compounds.

Preparation and characterization of particulate, finely divided basic zinc methacrylate-type additive for use in the invention is illustrated as follows:

Forty pounds of zinc oxide and forty-five pounds of water may be mixed to form a slurry in a jacketed mixer, equipped with an agitator and chopper, having a jacket temperature of 30° C. Then forty-two pounds of glacial methacrylic acid may be added in about 30 seconds. This mixture may then be agitated for about twenty minutes. The reaction product may be dried at 100° C. and ground. This product has a 92.2% assay of basic zinc methacrylate (as determined by the method described in application Ser. No. 441,716, the disclosure of which is hereby incorporated herein by reference) with a tetrahydrofuran soluble of 3.7% and 0.6% volatile (3 hours at 110° C.); for further details see Example III of Ser. No. 441,716. The expression "basic zinc methacrylate" is used to imply only that the product contains zinc and methacrylic acid radical in a one-to-one molar ratio. Nothing regarding the structural formula of the product is to be inferred from this terminology. The typical product is white in color and has an assay of basic zinc methacrylate of at least 90% by weight, passing through a 200 mesh sieve, preferably a 325 mesh sieve (U.S. sieve series), or finer. It has a specific gravity of 2.1 and a pH of from 6.0 to 6.25 in a water slurry. In thermogravimetric analysis it displays a 5% weight loss between 120° and 140° C., an additional 10% loss between 180° and 240° C., and an additional 35% loss between 320° and 430° C. In differential thermal analysis it displays a pronounced endothermic change peaking at 180° C., followed by smaller endothermic change at 235° C. By scanning electron microscope photography it is revealed to have a characteristic fibrous structure which can be destroyed by prolonged excessive heating.

The following examples, in which all quantities are expressed by weight, will serve to illustrate the practice of the invention in more detail.

EXAMPLE I

This example illustrates a composition containing 47 parts of particulate inorganic filler (silica) per 100 parts of polymer phase (EPDM plus polybutadiene).

The following ingredients are used, in the proportions indicated in Table I:

EPDM: Ethylene-propylene-5-ethylidene-2-norbornene terpolymer rubber; E/P ratio 56/44; ENB content 10%; viscosity 55 ML-4 at 257° F.

Resin: 1,2-Polybutadiene resin (Hystl [trademark] B-3000, mol. wt. 3000±300, viscosity 150–350 poises at 45° C.).

Carbon black: FEF N550.

Silica filler: precipitated hydrated silica (Hi Sil [trademark] 215).

Zinc oxide (used here as an activator; usually not calculated as part of filler unless used in very large amounts).

Calcium stearate.

Basic zinc methacrylate (for characterization, see above.)

Curative: dicumyl peroxide (40% active; Dicup [trademark] 40KE).

All the above ingredients except the basic zinc methacrylate and the peroxide were charged in a type B Banbury, #2 speed, water on full, at the part level indicated in Table I wherein Stock A (no basic zinc methacrylate) is outside the invention and is included for purposes of comparison, while Stocks B and C (containing the basic zinc methacrylate adjuvant) represent the practice of the invention. The EPDM and Hystl B-3000 were charged at 0 minutes—ram lowered—at one minute raise ram and charge remaining ingredients—lower ram and mix until 3 minutes—sweep down any loose material at 3 minutes and mix until 4 minutes and discharge (usually at 300° F.). Sheet stock off on warm mill. The compound is allowed to cool to room temperature, and is then returned to a two-roll mill, controlled at a temperature between 100°–170° F. The basic zinc methacrylate and peroxide curative are then mixed into the compound on the mill. The stock is sheeted on at 0.080 gauge and cut for testing.

The rheological properties of the compounds, as well as the cured physical properties, are summarized in Table I.

The data show the addition of basic zinc methacrylate significantly reduces the Mooney viscosity of silica/black filled EPDM compounds. The basic zinc methacrylate also contributes to the cure strength of the EPDM compound.

The combined effects of lower compound viscosity and higher cure strength is most unusual and desirable.

Table I-continued

| | Example I Compositions | | |
|---|---|---|---|
| psi 30' | 2460 | 2890 | 2880 |
| MPa | 17.0 | 19.9 | 19.9 |
| Flexural Modulus, | | | |
| psi × 10⁵ 30' | 1.1 | 1.3 | 1.4 |
| MPa | 760 | 900 | 970 |
| Shore D Hardness, | | | |
| 30' | 74 | 76 | 74 |

EXAMPLE II

The same procedures and ingredients as in Example I are used, except that the silica/carbon black ratios and levels were varied at basic zinc methacrylate levels of 1.5 and 5.0 p.h.r., as indicated in Table II.

The Table II data show that basic zinc methacrylate performs as a viscosity reductant and co-curing agent with peroxide at various carbon black/silica ratios and levels. Compounds with higher silica levels display a particularly remarkable compounded viscosity reduction with basic zinc methacrylate.

Table II

| Variables Stock: | II-A | II-B | II-C | II-D | II-E | II-F | II-G | II-H | II-I | II-J |
|---|---|---|---|---|---|---|---|---|---|---|
| HiSil 215 | 30.0 | 30.0 | 50.0 | 50.0 | 65.0 | 65.0 | 80.0 | 80.0 | 100.0 | 100.0 |
| N-550 Black | 100.0 | 100.0 | 80.0 | 80.0 | 65.0 | 65.0 | 50.0 | 50.0 | 50.0 | 50.0 |
| Basic Zinc Methacrylate | — | 5.0 | — | 5.0 | — | 5.0 | — | 5.0 | 1.5 | 5.0 |
| Mooney Viscosity - Compounded | | | | | | | | | | |
| ML-4 at 212° F. (100° C.) | 48 | 34 | 71 | 21 | 88 | 40 | 67 | 43 | 160 | 109 |
| Mooney Scorch at 257° F. - (125° C.) - ASTM D1646 | | | | | | | | | | |
| Scorch Time | 13'-15" | 16'-15" | 16'-15" | 9'-30" | 14'-30" | 9'-30" | 9'-0" | 10'-30" | 8'-0" | 4'-30" |
| Cure Rate | 12'-15" | 19'-15" | 10'-0" | 15'-45" | 7'-15" | 20'-30" | 38'-0" | 7'-30" | — | 4'-0" |
| Unaged Physical Properties | | | | | | | | | | |
| Cured at 330° F. (165° C.) | | | | | | | | | | |
| Tensile Strength, | | | | | | | | | | |
| psi 15' | 2060 | 2370 | 2450 | 2980 | 2290 | 2770 | 2510 | 2320 | 2430 | 2380 |
| MPa | 14.3 | 15.0 | 16.9 | 20.5 | 15.8 | 19.1 | 17.3 | 16.0 | 16.8 | 16.4 |
| psi 30' | 2080 | 2520 | 2350 | 2550 | 2480 | 2880 | 2460 | 2890 | 2640 | 2730 |
| MPa | 14.4 | 17.3 | 16.2 | 17.6 | 17.1 | 19.9 | 17.0 | 19.9 | 18.2 | 18.8 |
| Flexural Modulus, | | | | | | | | | | |
| psi × 10⁵ 30' | .58 | .70 | .56 | .57 | .63 | .58 | 1.1 | 1.3 | 1.6 | 1.5 |
| MPa | 400 | 480 | 390 | 390 | 430 | 400 | 760 | 900 | 1100 | 1030 |
| Shore D Hardness 30' | 65 | 70 | 70 | 70 | 70 | 72 | 74 | 76 | 76 | 78 |

Table I

| | Example I Compositions | | |
|---|---|---|---|
| Stock: | I-A | I-B | I-C |
| Ingredients | | | |
| EPDM | 100.0 | (same as I-A except | |
| Hystl B-3000 | 70.0 | basic zinc methacrylate) | |
| N-550 (FEF) Black | 50.0 | | |
| HiSil 215 (Silica) | 80.0 | | |
| Zinc Oxide | 5.0 | | |
| Calcium Stearate | 5.0 | | |
| Dicup 40 KE | 15.0 | | |
| Variable - Basic Zinc Methacrylate | — | 5.0 | 10.0 |
| Mooney Viscosity - Compounded | | | |
| ML-4 at 212° F. (100° C.) | 116 | 67 | 43 |
| Mooney Scorch at 257° F. (125° C.) - ASTM D1646 | | | |
| Scorch Time | 9'-0" | 10'-30" | 7'-15" |
| Cure Rate | 38'-0" | 7'-30" | 3'-45" |
| Unaged Physical Properties | | | |
| Cured at 330° F. (165° C.) | | | |
| Tensile Strength, | | | |
| psi 15' | 2510 | 2320 | 2340 |
| MPa | 17.3 | 16.0 | 16.1 |

EXAMPLE III

The following ingredients (and others as shown in Table III) were used:

SMR-5 CV: Standard Malaysian rubber, constant viscosity.

SBR-1500: Butadiene-styrene copolymer rubber, about 23% styrene, viscosity 52 ML-1+4, 212° F.

Butyl 100: Isoprene-isobutylene copolymer rubber, 0.7 mole-% unsaturation, viscosity 46 ML-1+4, 212° F.

NBR: Butadiene-acrylonitrile copolymer rubber, about 32% acrylonitrile, viscosity 50 ML-1+4, 212° F.

Cis-4 1203: Polybutadiene rubber of high cis content, viscosity 45 ML-1+4, 212° F.

Circosol (trademark) 4240: Process oil; light naphthenic petroleum hydrocarbon oil.

MBTS: Benzothiazyl disulfide accelerator.

Delac (trademark) NS: N-tert.-butyl-2-benzothiazole sulfenamide accelerator.

TMTDS: Tetramethylthiuram disulfide accelerator.

The ingredients were mixed in the proportions shown in Table III (according to appropriate ASTM polymer test recipes, with the exception of equivalent volumes of silica replacing the carbon black) to evaluate the effect of basic zinc methacrylate in several different elastomers. The same procedures as Example I were used.

The data in Table III show remarkable reduction in viscosity in a variety of polymer systems by the action of the basic zinc methacrylate additive.

Suprex (trademark) Clay: South Carolina hard clay (largely aluminum silicate)

Nucap (trademark) 100L: Aluminum silicate modified with a silane coupling agent-manufactured by J. M. Huber Laminar (trademark): Natural coated ground oyster shell (essentially calcium carbonate)

The same procedures were used as Example I.

The data in Table IV show remarkable reduction in

Table III

| Stock: | III-A | -B | -C | -D | -E | -F | -G | -H | -I | -J |
|---|---|---|---|---|---|---|---|---|---|---|
| SMR 5-Cv | 100 | 100 | | | | | | | | |
| SBR 1500 | | | 100 | 100 | | | | | | |
| Butyl 100 | | | | | 100 | 100 | | | | |
| NBR | | | | | | | 100 | 100 | | |
| Cis-4 1203 | | | | | | | | | 100 | 100 |
| HiSil 215 | 50.0 | 50.0 | 55.5 | 55.5 | 55.5 | 55.5 | 44.5 | 44.5 | 66.6 | 66.6 |
| Zinc Oxide | 5.0 | 5.0 | 3.0 | 3.0 | 3.0 | 3.0 | 5.0 | 5.0 | 3.0 | 3.0 |
| Stearic Acid | 1.0 | 1.0 | 1.0 | 1.0 | 1.0 | 1.0 | 1.0 | 1.0 | 2.0 | 2.0 |
| Circosol 4240 | — | — | — | — | — | — | — | — | 15.0 | 15.0 |
| MBTS | 1.0 | 1.0 | — | — | — | — | 1.0 | 1.0 | — | — |
| DELAC NS | — | — | 1.0 | 1.0 | — | — | — | — | 0.9 | 0.9 |
| TMTDS | — | — | — | — | 1.0 | 1.0 | — | — | — | — |
| Sulfur | 2.5 | 2.5 | 1.75 | 1.75 | 1.75 | 1.75 | 1.5 | 1.5 | 1.5 | 1.5 |
| Basic Zinc Methacrylate | — | 2.0 | — | 2.0 | — | 2.0 | — | 2.0 | — | 2.0 |
| Mooney Viscosity - Compounded | | | | | | | | | | |
| M1-4 at 212° F. (100° C.) | 103 | 46 | 97 | 92 | 147 | 127 | 99 | 94 | >200 | 169 |
| Mooney Scorch at 257° F. (125° C.) - ASTM D1646 | | | | | | | | | | |
| Scorch Time | 20'-30" | >35' | >30' | >35' | 17'-0" | >30' | >40' | >35' | Scorched | >35' |
| Cure Rate | 3'-30" | — | — | — | 12'-0" | — | — | — | — | — |
| Unaged Physical Properties | | | | | | | | | | |
| Cured at 320° F. (160° C.) | | | | | | | | | | |
| Tensile Strength | | | | | | | | | | |
| psi 15' | 1650 | 1330 | 520 | 600 | 1540* | 1380* | 1695 | 785 | 410 | 145 |
| MPa | 11.4 | 9.2 | 3.6 | 4.1 | 10.6 | 9.5 | 11.7 | 5.4 | 2.8 | 1.0 |
| psi 30' | 1740 | 1240 | 2050 | 1950 | 1630** | 1650** | 3210 | 2540 | 420 | 275 |
| MPa | 12.0 | 8.6 | 14.1 | 13.4 | 11.2 | 11.4 | 22.1 | 17.5 | 2.9 | 1.9 |
| 300% Modulus | | | | | | | | | | |
| psi 15' | 590 | 240 | 90 | 120 | 120* | 180 | 280 | 215 | 345 | 85 |
| MPa | 4.1 | 1.7 | 0.6 | 0.8 | 0.8 | 1.2 | 1.9 | 1.5 | 2.4 | 0.6 |
| psi 30' | 540 | 290 | 160 | 150 | 160** | 240** | 480 | 530 | — | 125 |
| MPa | 3.7 | 2.0 | 1.1 | 1.0 | 1.1 | 1.7 | 3.3 | 3.7 | — | 0.9 |
| Unaged Physical Properties | | | | | | | | | | |
| Elongation % 15' | 540 | 650 | 1330 | 1330 | 1130* | 1000* | 1125 | 1230 | 450 | 725 |
| 30' | 600 | 590 | 1160 | 1100 | 940** | 980** | 885 | 860 | 260 | 755 |
| Shore A Hardness 15' | 53 | 61 | 56 | 51 | 67* | 70* | 71 | 70 | 70 | 61 |
| 30' | 65 | 53 | 54 | 50 | 72** | 73** | 73 | 69 | 74 | 66 |

*Stocks cured 30' at 320° F.
**Stocks cured 60' at 320° F.

EXAMPLE IV

The following particulate fillers are used, in addition to the ingredients listed in Table IV:

York (trademark) Whiting: Calcium carbonate compound viscosity with a variety of non-black fillers, by the action of the basic zinc methacrylate additive.

The basic zinc methacrylate also provides improved Mooney scorch safety and an increase in modulus, tensile and hardness values at equivalent cures.

Table IV

| Stock: | IV-A | -B | -C | -D | -E | -F | -G | -H |
|---|---|---|---|---|---|---|---|---|
| SMR 5-Cv | 100.0 | | | | | | | |
| Zinc Oxide | 5.0 | | | (same as IV-A except for variables noted) | | | | |
| Stearic Acid | 1.0 | | | | | | | |
| MBTS | 1.0 | | | | | | | |
| Sulfur | 2.5 | | | | | | | |
| Variables: | | | | | | | | |
| York Whiting | 140 | 140 | | | | | | |
| Suprex Clay | | | 130 | 130 | | | | |
| Nucap 100L | | | | | 130 | 130 | | |
| Laminar | | | | | | | 135 | 135 |
| Basic Zinc Methacrylate | — | 2.0 | — | 2.0 | — | 2.0 | — | 2.0 |
| Mooney Viscosity - Compounded | | | | | | | | |
| ML-4 at 212° F. (100° C.) Unaged | 30 | 28 | 59 | 54 | 65 | 56 | 40 | 32 |

Table IV-continued

Example IV Compositions

| Stock: | IV-A | -B | -C | -D | -E | -F | -G | -H |
|---|---|---|---|---|---|---|---|---|
| Aged 7 weeks | 34 | 28 | 59 | 56 | 64 | 61 | 43 | 35 |
| Mooney Scorch at 257° F. (125° C.) - ASTM D1646 | | | | | | | | |
| Scorch Time | 22'-0" | 23'-45" | 17'-30" | 30'-0" | 17'-15" | 28'-15" | 19'-15" | 25'-15" |
| Cure Rate | 5'-0" | 8'-0" | 2'-15" | 4'-45" | 1'-45" | 4'-30" | 5'-15" | 8'-45" |
| Unaged Physical Properties | | | | | | | | |
| Cured at 320° F. (160° C.) | | | | | | | | |
| Tensile Strength | | | | | | | | |
| psi 15' | 1000 | 920 | 1965 | 1820 | 2190 | 2675 | 1655 | 1850 |
| MPa | 6.9 | 6.3 | 13.6 | 12.6 | 15.1 | 18.4 | 11.4 | 12.8 |
| psi 30' | 845 | 820 | 2020 | 2315 | 2155 | 2520 | 1630 | 1650 |
| MPa | 5.8 | 5.7 | 13.9 | 16.0 | 14.9 | 17.4 | 11.2 | 11.4 |
| Unaged Physical Properties | | | | | | | | |
| 300% Modulus | | | | | | | | |
| psi 15' | 205 | 250 | 1600 | — | 1975 | 2410 | 765 | 850 |
| MPa | 1.4 | 1.7 | 11.0 | — | 13.6 | 16.6 | 5.3 | 5.9 |
| psi 30' | 165 | 220 | 1400 | 1750 | 1795 | 2325 | 670 | 750 |
| MPa | 1.1 | 1.5 | 9.7 | 12.1 | 12.4 | 16.0 | 4.6 | 5.2 |
| Elongation %, 15' | 690 | 580 | 365 | 290 | 330 | 330 | 475 | 490 |
| 30' | 715 | 600 | 405 | 380 | 355 | 320 | 540 | 400 |
| Shore A Hardness, 15' | 47 | 55 | 60 | 63 | 64 | 61 | 53 | 55 |
| 30' | 45 | 54 | 61 | 67 | 66 | 67 | 53 | 55 |

EXAMPLE V

The invention is particularly applicable to preblends of butadiene-acrylonitrile rubber with polyvinyl chloride resin (usually in weight ratio within the range of from 80:20 to 20:80), ordinarily prefused with 5–20 parts of a plasticizer such as dioctylphthalate or the like. Such preblends when filled with silica are inherently high viscosity because of the rigid nature of the polyvinyl chloride polymer and the binding nature of the silica filler. This example illustrates practice of the invention with such a blend of butadiene-acrylonitrile rubber and polyvinyl chloride resin (50:50 weight ratio) which has been prefused with dioctyl phthalate plasticizer (15 parts). Two stocks V-A and V-B, identical in every respect except that stock V-A does not contain basic zinc methacrylate while stock V-B does, are prepared as follows:

| Stock: | V-A | V-B |
|---|---|---|
| NBR:PVC Preblend; 75 ML 1 + 4 at 212° F. (100° C.) | 75.0 | (same as V-A except for basic Zn methacr.) |
| NBR | 25.0 | |
| Hil Sil 215 | 40.0 | |
| Zinc oxide | 3.0 | |
| Stearic acid | 1.0 | |
| Antioxidant (hindered bis-phenol; Naugawhite [trademark]) | 1.0 | |
| Dioctyl phthalate | 10.0 | |
| Polyethylene glycol 4000 mol. wt. (Carbowax 4000 [trademark]) | 1.0 | |
| Sulfur | 2.25 | |
| Paraffin wax | 1.0 | |
| TMTMS | 0.5 | |
| Delac NS | 1.5 | |
| Basic zinc methacrylate | — | 2.0 |

The same procedures are used as in Example I, to obtain the data shown in Table V.

The data in Table V show that basic zinc methacrylate provides a substantial improvement in the processing scorch safety of a sulfur cured nitrile rubber/PVC compound, without significantly affecting the compound's modulus development. The "basic" zinc methacrylate also lowers the compound viscosity. A lower viscosity and longer scorch time are particularly useful for improving the extrusion properties of the base compound.

Table V

Properties of Example V Compositions

| Stock: | V-A | V-B |
|---|---|---|
| Variable: Basic Zinc Methacrylate | — | 2.0 |
| Mooney Viscosity - Compounded | | |
| ML-4 at 212° F. (100° C.) | 89 | 72 |
| Mooney Scorch at 270° F. (132° C.) - ASTM D1646 | | |
| Scorch Time | 15'-0" | 30'-0" |
| Cure Rate | 1'-15" | 2'-15" |
| Cured at 350° F. (177° C.) | Unaged Physical Properties | |
| 100% Modulus, psi 6' | 800 | 820 |
| MPa | 4.5 | 5.7 |
| psi 8' | 860 | 830 |
| MPa | 5.9 | 5.7 |
| Tensile Strength, psi 6' | 3180 | 2870 |
| MPa | 21.9 | 19.8 |
| psi 8' | 3260 | 2890 |
| MPa | 22.5 | 19.9 |
| Elongation %, 6' | 430 | 430 |
| 8' | 430 | 390 |
| Shore A Hardness 6' | 79 | 81 |
| 8' | 82 | 80 |

EXAMPLE VI

Three stocks are prepared according to the following recipes, varying only the basic zinc methacrylate, and the data shown in Table VI are obtained by following the procedures of Example I.

| Stock: | VI-A | VI-B | VI-C |
|---|---|---|---|
| Natural Rubber (SMR 5-CV) | 100.0 | (same as VI-A except as noted) | |
| Hil Sil 215 | 50.0 | | |
| Carbowax 4000 | 1.0 | | |
| Zinc oxide | 5.0 | | |
| Stearic acid | 1.0 | | |
| Sulfur | 2.5 | | |
| MBTS | 1.0 | | |
| Variable: | | | |

-continued

| Stock: | VI-A | VI-B | VI-C |
|---|---|---|---|
| Basic zinc methacrylate | — | 1.0 | 2.0 |

The data in Table VI show that "basic" zinc methacrylate increases the extrusion rate of a natural rubber compound. The "basic" zinc methacrylate also reduced the Mooney viscosity and provided increased scorch safety.

Table VI
Properties of Example VI Compositions

| Stock: | VI-A | VI-B | VI-C |
|---|---|---|---|
| Variable: Basic Zinc Methacrylate | — | 1.0 | 2.0 |
| Mooney Viscosity - Compounded | | | |
| ML-4 at 212° F. (100° C.) | 83 | 55 | 39 |
| Mooney Scorch at 270° F. (132° C.) - ASTM D1646 | | | |
| Scorch Time | 28'-30" | 36'-0" | 44' |
| Cure Rate | 6'-15" | 9'-0" | — |
| Extrusion Rates at 230° F. (110° C.) Garvey Die, 40 RPM | | | |
| grams/min. | 323 | 526 | 703 |
| inches/min. | 125 | 164 | 212 |
| mm/min. | 2920 | 3840 | 4960 |
| Unaged Physical Properties | | | |
| Cured at 320° F. (160° C.) | | | |
| 300% Modulus, | | | |
| psi 15' | 430 | 400 | 420 |
| MPa | 3.0 | 2.7 | 2.9 |
| psi 30' | 390 | 400 | 350 |
| MPa | 2.7 | 2.8 | 2.4 |
| Tensile Strength, | | | |
| psi 15' | 1730 | 1680 | 1750 |
| MPa | 11.9 | 11.6 | 12.0 |
| psi 30' | 1890 | 1950 | 1860 |
| MPa | 13.0 | 13.5 | 12.8 |
| Elongation %, | | | |
| 15' | 580 | 590 | 590 |
| 30' | 630 | 650 | 650 |
| Shore A Hardness | | | |
| 15' | 61 | 61 | 60 |
| 30' | 56 | 53 | 56 |

EXAMPLE VII

The following three formulations are prepared and tested, with the results shown in Table VII:

| Stock: | VII-A | VII-B | VII-C |
|---|---|---|---|
| EPDM rubber (as in Ex. I) | 100.0 | | |
| Hi Sil 215 | 55.0 | (same as | |
| Zinc oxide | 5.0 | VIII - A | |
| Stearic Acid | 1.0 | except as | |
| Carbowax 4000 | 1.0 | noted) | |
| Circosol 4240 | 10.0 | | |
| TMTDS | 1.0 | | |
| 2-Mercaptobenzothiazole (MBT [trademark]) | 0.5 | | |
| Sulfur | 1.5 | | |
| Variable: | | | |
| Basic zinc methacrylate | — | 1.0 | 2.0 |

The data in Table VII show that "basic" zinc methacrylate improves the extrusion rate of a silica filled EPDM rubber compound. The Mooney viscosity and scorch values were also improved by the "basic" zinc methacrylate.

Table VII
Properties of Example VII Compositions

| Stock: | VII-A | VII-B | VII-C |
|---|---|---|---|
| Variable - Basic Zinc Methacrylate | — | 1.0 | 2.0 |
| Mooney Viscosity - Compounded | | | |
| ML-4 at 212° F. (100° C.) | >200 | 172 | 150 |
| ML-4 at 250° F. (121° C.) | >200 | 152 | 136 |
| Mooney Scorch at 270° F. (132° C.) - ASTM D1646 | | | |
| Scorch Time | 5'-30" | 6'-30" | 7'-0" |
| Cure Rate | 1'-15" | 1'-30" | 1'-30" |
| Extrusion Rates at 230° F. (110° C.) Garvey Die, 40 RPM | | | |
| grams/min. | 128 | 149 | 175 |
| inches/min. | 63 | 73 | 83 |
| mm/min. | 1600 | 1850 | 2110 |
| Cured at 320° F. (160° C.) | Unaged Pysical Properties | | |
| 300% Modulus, | | | |
| psi 15' | 530 | 450 | 510 |
| MPa | 3.6 | 3.1 | 3.6 |
| psi 30' | 540 | 790 | 700 |
| MPa | 3.7 | 5.4 | 4.8 |
| Tensile Strength, | | | |
| psi 15' | 2700 | 3190 | 3160 |
| MPa | 18.6 | 22.0 | 21.8 |
| psi 30' | 3210 | 3370 | 3420 |
| MPa | 22.1 | 23.2 | 23.6 |
| Elongation %, | | | |
| 15' | 700 | 810 | 780 |
| 30' | 720 | 765 | 755 |
| Shore A Hardness, | | | |
| 15' | 76 | 77 | 76 |
| 30' | 76 | 77 | 75 |

EXAMPLE VIII

The following stocks are prepared and processed as in the previous examples, with the results shown in Table VIII:

| Stock: | VIII-A | VIII-B |
|---|---|---|
| NBR:PVC Preblend as in Ex. V | 100.0 | |
| Hi Sil 215 | 35.0 | (same as |
| Zinc oxide | 3.0 | VIII-A |
| Stearic acid | 1.0 | except as |
| Antioxidant (hindered bis-phenol; Naugawhite [trademark]) | 1.0 | noted) |
| Carbowax 4000 | 1.0 | |
| Sulfur | 2.0 | |
| Paraffin wax | 1.0 | |
| TMTMS (tetramethyl thiuram monosulfide) | 0.5 | |
| Variables: | | |
| Dioctyle phthalate | 10.0 | — |
| Basic zinc methacrylate | — | 2.0 |

Since the NBR:PVC preblend includes 15 parts of dioctyl phthalate plasticizer, the amount of polymer (elastomer blend) present is 85 parts (100−15=85), which calculates to 41 parts of filler (silica) per 100 parts of elastomer.

The data in Table VIII show that 2 parts of "basic" zinc methacrylate can be used in place of added 10 parts of dioctylphthalate (DOP) plasticizer, for improved modulus strength, while maintaining a similar Mooney viscosity.

"Basic" zinc methacrylate (a powder) has the added advantages of being easier to handle and mix and is also non-extractable and non-migrating.

Table VIII

Properties of Example VIII Compositions

| Stock: | VIII-A | VIII-B |
|---|---|---|
| Variables - Dioctyl phthalate | 10.0 | 0.0 |
| Basic Zinc Methacrylate | — | 2.0 |
| Mooney Viscosity - Compounded | | |
| ML-4 at 212° F. (100° C.) | 103 | 107 |
| Mooney Scorch at 270° F. (132° C.) - ASTM D1646 | | |
| Scorch Time | 20'-45" | 18'-0" |
| Cure Rate | 2'-0" | 2'-30" |
| Cured at 350° F. (177° C.) Unaged Physical Properties | | |
| 100% Modulus, | | |
| psi 6' | 790 | 1130 |
| MPa | 5.5 | 7.8 |
| psi 8' | 790 | 1160 |
| MPa | 5.4 | 8.0 |
| Tensile Strength | | |
| psi 6' | 2420 | 2380 |
| MPa | 16.8 | 15.0 |
| psi 8' | 2200 | 2340 |
| MPa | 15.2 | 14.7 |
| Elongation %, | | |
| 6' | 420 | 350 |
| 8' | 390 | 340 |
| Shore A Hardness | | |
| 6' | 81 | 86 |
| 8' | 82 | 86 |

We claim:

1. A compounded elastomeric composition characterized by reduced Mooney viscosity comprising, in admixture, (A) 100 parts by weight of elastomer, (B) from 40 to 140 parts by weight of particulate inorganic filler and (C), from 0.1 to 7 parts by weight of finely divided particulate basic zinc methacrylate as an adjuvant, whereby the Mooney viscosity of the compounded elastomeric composition is reduced compared to the Mooney viscosity of an otherwise similar composition not containing the said basic zinc methacrylate adjuvant (C), the said elastomer being selected from the group consisting of natural rubber, cis-polybutadiene rubber, butadiene-styrene copolymer rubber, butadiene-acrylonitrile copolymer rubber, isoprene-isobutylene copolymer rubber, and unsaturated terpolymer of ethylene, propylene and a copolymerizable non-conjugated diene, wherein the said particulate inorganic filler (B) is selected from the group consisting of (i) silica filler (ii) a silicate filler and (iii) calcium cabonate filler.

2. A compounded elastomeric composition as in claim 1 in which the said filler (B) is silica filler.

3. A compounded elastomeric composition as in claim 1 in which the said filler (B) is aluminum silicate.

4. A compounded elastomeric composition as in claim 1 in which the said filler (B) is calcium carbonate.

* * * * *